United States Patent [19]
Hodama

[11] 3,983,484
[45] Sept. 28, 1976

[54] MULTICHANNEL SIGNAL TRANSMITTING AND RECEIVING APPARATUS

[75] Inventor: Takuo Hodama, Okegawa, Japan

[73] Assignee: Nihon Dengyo Co., Ltd., Tokyo, Japan

[22] Filed: May 9, 1975

[21] Appl. No.: 576,238

[30] Foreign Application Priority Data
Dec. 6, 1974 Japan .................. 49-146912[U]
Apr. 10, 1975 Japan ....................... 50-47590

[52] U.S. Cl. .................... 325/20; 325/21; 325/25; 343/176
[51] Int. Cl.² ........................ H04B 1/40
[58] Field of Search .................. 325/15–17, 325/19–21, 25, 18; 343/200, 175–181

[56] References Cited
UNITED STATES PATENTS

| | | | |
|---|---|---|---|
| 3,201,692 | 8/1965 | Sichak et al. | 325/17 |
| 3,413,554 | 11/1968 | Yates et al. | 325/25 |
| 3,487,311 | 12/1969 | Luhowy | 325/25 |
| 3,641,434 | 2/1972 | Yates et al. | 325/25 |
| 3,696,422 | 10/1972 | Burrell | 325/17 |
| 3,825,830 | 7/1974 | O'Connor | 343/180 |
| 3,916,412 | 10/1975 | Amoroso, Jr. | 325/20 |
| 3,944,925 | 3/1976 | De Laune | 325/17 |
| 3,949,296 | 4/1976 | McClaskey et al. | 325/17 |

Primary Examiner—Robert L. Griffin
Assistant Examiner—Marc E. Bookbinder
Attorney, Agent, or Firm—Haseltine, Lake & Waters

[57] ABSTRACT

A multichannel signal transmitting and receiving apparatus comprises a single reference local oscillator, a phase locked loop including a phase comparator receiving as one input a signal resulting from a frequency division of the output of the local oscillator and a voltage controlled oscillator, a frequency divider for supplying the output of the voltage controlled oscillator as another input to the phase comparator, a circuit for heterodyning a signal received through an antenna with the oscillation outputs of the voltage controlled oscillator and the local oscillator and thereafter detecting the signal thus heterodyned thereby to obtain an audio signal, a frequency converter for obtaining a carrier wave for signal transmission from the oscillation outputs of the local oscillator and the voltage controlled oscillator, a circuit for modulating the carrier wave thus obtained with the audio signal and transmitting the modulated signal through the antenna, a circuit for controllably changing over the oscillation frequency of the local oscillator between different values respectively for signal reception and signal transmission, and a circuit for so controllably changing over the frequency division ratio of the frequency divider between different values respectively for signal transmission and signal reception for each of a plurality of channels. The single local oscillator is used for both signal reception and signal transmission. The frequency converter is provided outside of the loop of the phase locked loop.

5 Claims, 3 Drawing Figures

MULTICHANNEL SIGNAL TRANSMITTING AND RECEIVING APPARATUS

BACKGROUND OF THE INVENTION

This invention relates generally to apparatuses for transmitting and receiving multichannel signals and more particularly to a multichannel signal transmitting and receiving apparatus of the so-called transceiver type capable of accomplishing transmission and reception of signals of a plurality of channels of a specific frequency band.

In general, in a multichannel signal transmitting and receiving apparatus of this character, carrier waves, local oscillation signals, and the like of frequencies differing with the channels at the time of transmission and at the time of reception are used. For this reason, in a conventional multichannel signal transmitting and receiving apparatus, a plurality of oscillators are used for obtaining the signals of the above mentioned required different frequencies, whereby the circuit organization becomes very complicated, and this gives rise to undesirable features such as high price of the apparatus and difficulty of miniaturizing the same.

SUMMARY OF THE INVENTION

Accordingly, it is a general object of the present invention to provide a novel and useful multichannel signal transmitting and receiving apparatus in which the above described difficulties and problems have been overcome.

Another and specific object of the invention is to provide a multichannel signal transmitting and receiving apparatus capable of carrying out transmission and reception of multichannel signals by using a single reference signal oscillator. Since a single reference signal oscillator is sufficient in accordance with the apparatus of the invention, the circuit organization can be greatly simplified, whereby the apparatus can be made low-priced and can be miniaturized.

Still another object of the invention is to provide a multichannel signal transmitting and receiving apparatus having a phase locked loop including a frequency divider receiving as input a signal of a specific frequency which has been obtained by frequency division from a reference frequency signal, the frequency division ratio thereof being varied in accordance with a specific channel, and producing as output a signal of a desired frequency, and frequency converting means supplied with the output of the phase locked loop and the reference signal and producing as output a carrier wave at the time of signal transmission, the frequency converting means being provided outside of the phase locked loop. By the organization of the apparatus of the present invention, there is no occurrence of interference of the output signal frequency of the phase locked loop.

Further objects and features of the invention will be apparent from the following detailed description when read in conjunction with the accompanying drawings.

DETAILED DESCRIPTION

Figure 1:
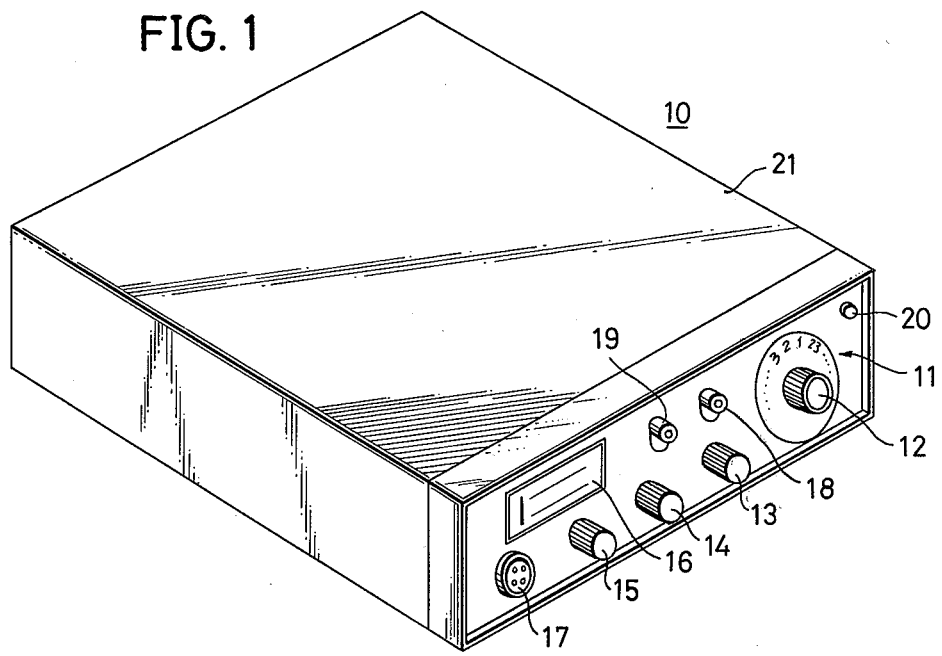
FIG. 1 is a perspective view of the exterior of an embodiment of a multichannel signal transmitting and receiving apparatus according to the invention as viewed from a point above, to the left of, and to the front of the apparatus.

Referring first to FIG. 1, the multichannel signal transmitting and receiving apparatus 10 shown in perspective view therein is provided with a front panel 11, on which are mounted in appropriate arrangement a number of control means. The essential control means are a knob 12 for a channel selector, a knob 13 for fine adjustment of the reference oscillation frequency at the time of reception called delta tuning as described hereinafter, a knob 14 for adjustment of a squelch circuit, a knob 15 for ON-OFF switching of the power supply and for volume control, a meter 16, a microphone connecting socket 17, a button switch 18 for PA-CB switching, an ON-OFF button switch 19 of an auto noise limiter, and an indicator lamp 20.

Although not shown, an antenna connector a PA loudspeaker jack socket, a power supply cord, and other parts are provided on the rear face of the casing 21. The casing 21 houses therewithin an electrical circuit described hereinbelow.

Figure 2:
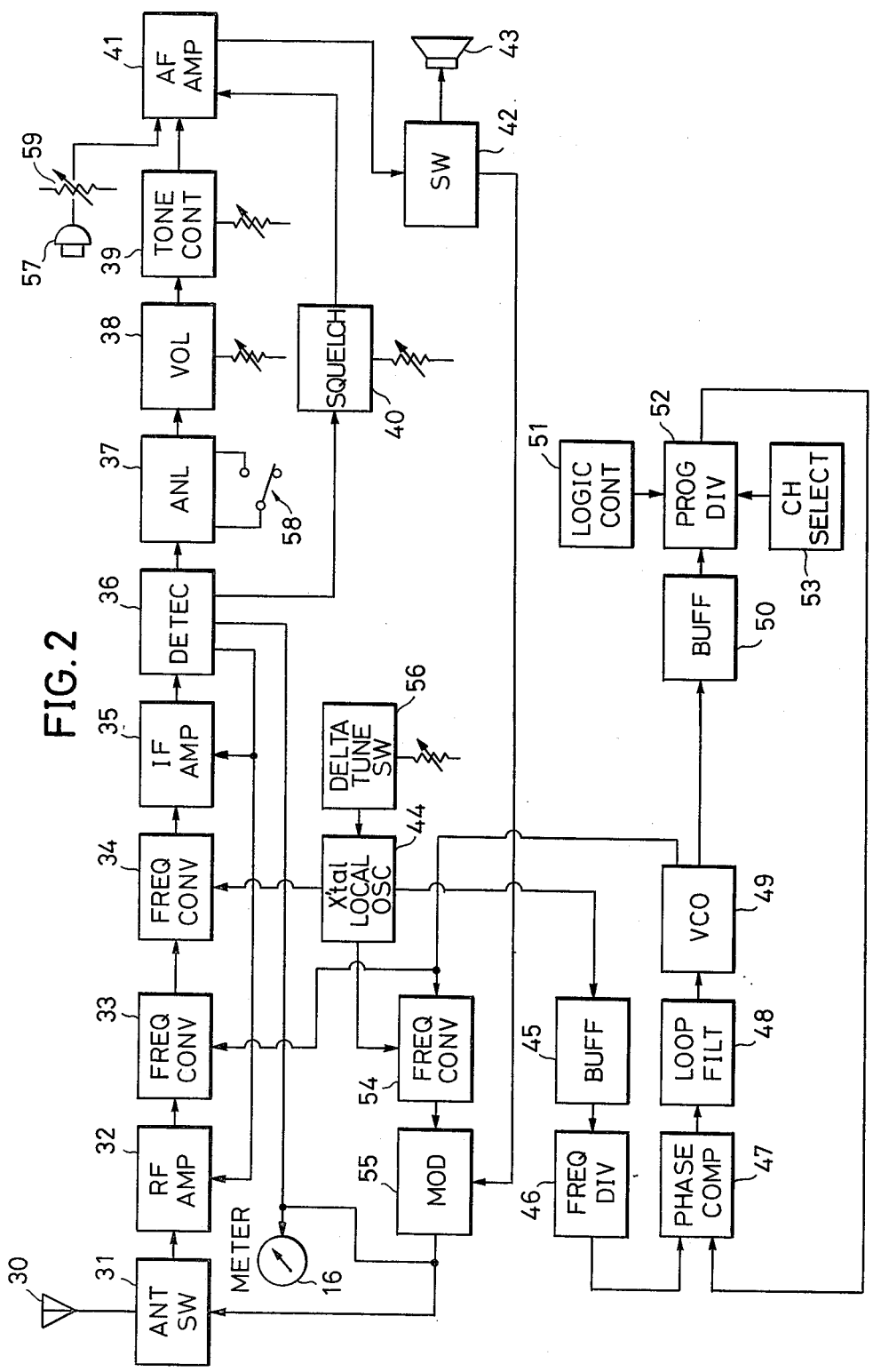
FIG. 2 is a block diagram showing the essential organization of one embodiment of a circuit of a multichannel signal transmitting and receiving apparatus according to the invention.

One embodiment of this circuit accommodated within the casing 21 of the apparatus 10 is shown by block diagram in FIG. 2. The circuit of this embodiment has the circuit organization of, for example, a transceiver of a double superheterodyne using the so-called 27 MHz citizen band of class D stations, part 95, of the Rules and Regulations of the Federal Communications Commission (F.C.C.) of the U.S.A. In this case, there are a total of 23 channels in class D stations, the allocation frequencies of which are from 26.965 MHz of the first channel to 27.255 MHz of the 23rd channel, and the frequency differences between channels are of a minimum of 10 KHz and a maximum of 30 KHz and are 10 KHz or an integral multiple thereof.

First, the circuit system and its operation at the time of signal reception will be described.

A radio-frequency signal introduced through an antenna 30 is supplied by way of an antenna switch circuit 31 to a radio-frequency amplifier 32, where it is amplified and is then supplied to a first frequency converter 33.

On one hand, there is provided a crystal local oscillator 44 caused to oscillate at a frequency of 10.240 MHz by a delta tuning and switching circuit 56 at the time of signal reception. This circuit 56 has switching means operating at the time of signal transmission and the time of signal reception to change over the value of a capacitance to be connected to the crystal of the crystal reference local oscillator 44 thereby to change over the oscillation frequency thereof to a value as described hereinafter and, in addition, a variable resistor for finely adjusting the oscillation frequency thereof at the time of signal reception so as to effect accurate matching with respect to deviation of the frequency of the received signal.

The reference output oscillation signal at the time of reception of a signal of 10.240 MHz from the crystal local oscillator 44 is fed, on the one hand, to a second frequency converter 34 and, on another hand, by way of a buffer circuit 45 to a frequency divider 46, where it is frequency divided into 1/1024 and rendered into a signal of 10 KHz. This signal is then fed to a phase comparator 47. This phase comparator 47 produces as output a phase comparison error signal, which is fed by way of a loop filter 48 to a voltage controlled oscillator (hereinafter referred to as VCO) 49 thereby to control the output oscillation frequency thereof.

The output of the VCO 49 is supplied to the first frequency converter 33 and, at the same time, by way of a buffer circuit 50 to a programmable frequency divider 52, the frequency dividing ratio of which is changed over respectively at the time of transmission and at the time of reception by a logical control circuit 51. This logical control circuit 51 is constituted by a simple logical circuit which has been arranged in programming. The frequency dividing ratio of the programmable divider 52 is switched over to a value corresponding the signal reception channel by the channel selection made by a channel selector 53, which is switched over by the manipulative turning of the aforementioned knob 12.

Here, the reception of, for example, a first channel signal of 26.965 MHz will be considered. In this case, the frequency dividing ratio of the programmable divider 52 is set at 1,627, and the frequency of the oscillation output signal of the VCO 49 becomes 16.270. The output signal of 10 KHz of the frequency divider 52 is supplied to the above mentioned phase comparator 47.

It is to be noted that the loop of the phase comparator 47, the loop filter 48, the VCO 49, the buffer circuit 50, and the programmable frequency divider 52 constitutes a phase locked loop (PLL). Furthermore, the VCO 49 is adapted to oscillate at a frequency of the order of 16 to 17 MHz, and its oscillation frequency is so locked by the PLL that the output signal of the programmable frequency divider 52 is always of a frequency of 10 KHz.

The output oscillation signal of 16.270 MHz of the VCO 49 is supplied as a first local oscillation frequency to the aforementioned first frequency converter 33, and from the frequency converter 33, a first intermediate-frequency signal of 10.695 MHz of the difference between the 29.965 MHz and the 16.270 MHz is derived. This first intermediate-frequency signal is supplied to the second frequency converter by the signal of 10.240 MHz from the crystal local oscillator 44, and a second intermediate-frequency signal of 455 KHz is led out from the frequency converter 34.

Similarly, in the case where, for example, a signal of 27.255 MHz of the 23rd channel is to be received, the frequency division ratio of the programmable frequency divider 52 is caused to be 1,656 by the switching selection of the channel selector 53. As a result, the output oscillation frequency of the VCO 49 becomes 16.56 MHz. Consequently, a first intermediate-frequency signal of 10.695 MHz is similarly led out of the frequency converter 33, and a second intermediate-frequency signal of 455 KHz is led out of the frequency converter 34.

The second intermediate-frequency signal from the frequency converter 34 is amplified by an intermediate-frequency amplifier 35 and then supplied to a detector 36 where it is detected or demodulated and rendered into an audio signal. A portion of the output of the detector 36 is supplied to the amplifiers 32 and 35, and automatic gain control is accomplished. Furthermore, another portion of the output of the detector 36 is supplied to the meter 16.

The output audio signal of the detector 36 is supplied successively by way of an auto noise limiter 37 having a switch 58 operable in ON-OFF switching by manipulation of the aforementioned button 19, a volume controller 38 adjustable by manipulation of the knob 15, and a tone control circuit 39 to an audio-frequency amplifier 41. Between the detector 36 and this amplifier 41, there is connected a squelch circuit 40 adjustable by manipulation of the knob 14. The signal amplified by the amplifier 41 is supplied by way of a change-over switch 42 to a loudspeaker 43 and is thereby emitted as sound.

The frequency division ratio of the programmable frequency divider 52 is switched over by the channel selection switching manipulation of the knob 12 as described above, and a signal of a frequency necessary for continually obtaining a first intermediate frequency signal of 10.695 MHz with the first frequency converter 33 in accordance with the frequency of the channel being received is generated from the VCO 49. Therefore, a first intermediate-frequency signal without deviation is obtained for each channel.

Next, the circuit system and the operation thereof at the time of signal transmission will be described.

At the time of signal transmission, a button (not shown) provided on the housing of a microphone 57 is pressed, whereupon the antenna switch circuit 31, the amplifier 41, the changeover switch 42, the logical control circuit 51, the switch-over circuit 56, and the like are all automatically switched over to their respective states for signal transmission.

An audio signal from the microphone is supplied through a variable resistor 59 for microphone gain adjustment to the audio frequency amplifier 41 where it is amplified, and the signal thus amplified is then fed by way of the change-over switch 42 to an amplitude modulator comprising a driver and power amplifier 55.

On the other hand, the crystal local oscillator 44 is switched and set to oscillate at a frequency of 10.238102 MHz by the switch-over circuit 56. The output oscillation reference signal of the osicllator 44 is supplied to a frequency converter 54 of the transmission section and, at the same time, is supplied to the phase comparator 47 after being rendered into a signal of a frequency of approximately 9.998146 KHz upon being frequency divided by 1/1024 by the frequency divider 46.

Furthermore, the programmable frequency divider 52 is so set by the logical control circuit 51 as to assume the frequency division ratio at the time of signal transmission. Accordingly, in the case where the first channel, for example, is selected by the channel selector 53 actuated in switch-over operation by manipulation of the knob 12, the frequency division ratio is caused to be 1,673. Consequently, the frequency of the oscillation output signal of the VCO 49, whose oscillation frequency is controlled by the output of the phase comparator 47 becomes 16.726898 MHz.

The oscillation output signal of the VCO 49 is supplied to the frequency converter 54, and a signal of a frequency of 26.965 MHz, which is the sum of the frequency of the oscillation signal from the crystal local oscillator 44 and the oscillation signal frequency from the VCO 49, is led out from the frequency converter 54.

This carrier wave of 26.965 MHz for the first channel is amplitude modulated in the amplitude modulator 55 by the audio signal supplied from the amplifier 41 by way of the above mentioned changeover switch 42, and one portion of the first channel amplitude modulated wave thus obtained is supplied to the meter 16, where its level is indicated, and, at the same time, passes through the antenna switch circuit 31 to be transmitted from the antenna 30.

In the case where a signal of the 23rd channel, for example, is to be transmitted, a similar operation is carried out. The frequency division ratio of the programmable frequency divider 52 is set at 1,702 by the selection of the 23rd channel of the channel selector 53, whereupon the output oscillation frequency of the VCO 49 becomes 17.016845 MHz. Consequently, the frequency of the output carrier wave signal of the frequency converter 54 becomes 27.254947 MHz.

It is to be noted in this connection that the normal carrier wave frequency at the time of signal transmission of the 23rd channel is determined at 27.255 MHz, but, with respect to this, the carrier wave frequency obtained in the above described manner differs by a mere 53 Hz, and a deviation of this order can be amply allowable in actual practice. Furthermore, this deviation is 0.0002 percent, which is amply within the standard limiting specification of ± 0.005 percent for frequency deviation of the F.C.C. of the U.S.A.

Here, the manner in which the frequency of the crystal local oscillator 44 and the frequency division ratio of the programmable frequency divider 52 at the time of signal transmission will described.

The carrier wave frequency of the first channel being 26.965 MHz, the following relationship between the oscillation frequency $f_{VCO}$ of the VCO 49 and the oscillation frequency $f_{LOC}$ of the crystal local oscillator 44 is obtained.

$$f_{LOC} + f_{VOC} = 26.965 \text{ MHz} \tag{1}$$

Furthermore, in the phase comparator 47, the following equation is valid.

$$(f_{LOC})/(1024) = (f_{VCO})/(N_1) \ (\approx 10 \text{ KHz}), \tag{2}$$

where $N_1$ is the frequency division ratio of the programmable frequency divider 52 at the time of signal transmission of the first channel. From the above Eqs. (1) and (2), the frequency $f_{LOC}$ becomes $$f_{LOC} = (26.965 \times 1024)/N_1 + 1024.$$

When the integral value of $N_1$ which will cause $f_{LOC}$ to assume a value nearest 10.240 MHz is determined, $$N_1 = 1,673, \text{ and}$$

$$f_{LOC} = 10.238102 \text{ (MHz)}$$

are obtained.

In the above described embodiment, the oscillation frequency of the crystal local oscillator 44 is so set that the deviation of carrier wave frequency with respect to the first channel will be zero at the time of signal transmission. For this reason, the carrier wave frequency deviation of the 23rd channel is the maximum (−53 Hz). However, by so selecting the oscillation frequency of the crystal local oscillator 44 at the time of signal transmission that the carrier wave frequency deviation with respect to the 12th channel, for example, becomes zero, the maximum carrier wave frequency deviation with respect to all channels can be held within ±0.0001 percent, and even higher accuracy is attained.

As described above, by merely shifting the oscillation frequency at the time of signal transmission of the crystal local oscillator 44 by approximately 1.9 KHz, for example, toward the low side with respect to the oscillation frequency at the time of signal reception, frequency conversion can be carried out with zero frequency deviation at the time of signal reception, and, moreover, a carrier wave frequency for transmission can be obtained at the time of signal transmission with a very small frequency deviation of the order of ± 0.0001 percent to ± 0.0002 percent as a maximum. Since only a single crystal local oscillator is sufficient, the circuit is of a simple organization and can be produced at low cost.

Furthermore, the frequency converter 54 is not provided with the PLL comprising the phase comparator 47, the loop filter 48, the VCO 49, the buffer circuit 50, and the programmable frequency divider 52 but is provided outside of this loop. For this reason, interference of the frequencies generated at the time of signal transmission and at the time of signal reception can be eliminated. Furthermore, since the frequency range of operation as a PLL is expanded to the range within which control of the oscillation frequency of the VCO 49 is possible, stable operation can be accomplished.

Figure 3:
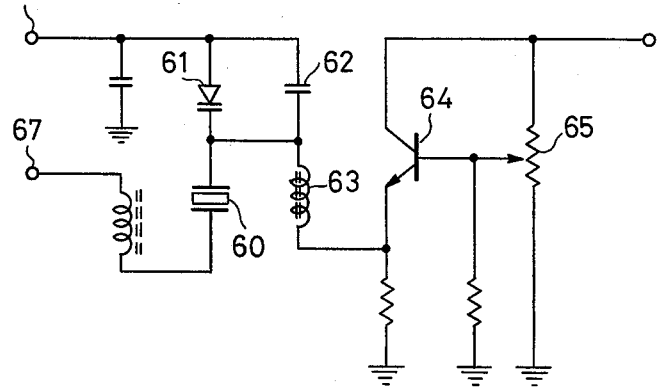
FIG. 3 is a circuit diagram showing one embodiment of a reference local oscillator and a delta tuning and switching circuit part.

Next, one embodiment of a specific circuit in concrete form of a circuit part including the above described reference local oscillator 44 and delta tuning and switch-over circuit 56 will be described with reference to FIG. 3. In this circuit, a parallel connection of a variable capacitance diode 61 and a capacitor 62 is connected in series to a crystal 60. To the junction between the variable capacitance diode 61 and the crystal 60, the emitter of a transistor 64 is connected through a coil 63. The base of the transistor 64 is connected to the slidable contact of a variable resistor 65.

At the time of signal reception, a positive voltage is not impressed on a terminal 66 connected to the parallel connection of the variable capacitance diode 61 and the capacitor 62 on the side opposite from the crystal 60, which is in a state wherein the capacitance of the variable capacitance diode 61 and the capacitance of the capacitor 62 are connected in parallel thereto, and a reference oscillation output of 10.240 MHz is led out through a terminal 67 as described above.

In many cases, at the time of signal reception, the reception frequency has been slightly offset from the frequency of the specified channel. In such a case, therefore, the resistance value of the variable resistor 65 is adjustably varied by turning the knob 13. As a consequence, the emitter voltage of the transistor varies, and the voltage impressed on the variable capacitance diode 61 varies, whereby the capacitance value of this diode 61 changes. As a result, the oscillation frequency of the crystal oscillator is finely adjusted in a continuous manner.

At the time of signal transmission, on the other hand, a positive voltage is impressed on the terminal 66 when the button provided on the aforementioned microphone 57 is pressed. Consequently, the variable capacitance diode 61 is rendered conductive, and, in actuality, a capacitor is no longer connected to the crystal 60, whose oscillation frequency decreases. Then, as described above, an oscillation frequency of 10.238102

MHz is led out from the terminal 67 as described above.

While in the above described embodiment, amplitude-modulated waves of a both side-band system are used for signal transmission and reception signals, the present invention is not so limited, it being possible to use frequency-modulated waves or amplitude-modulated waves of a single side band (SSB) system.

Further, this invention is not limited to these embodiments but various variations and modifications may be made without departing from the scope and spirit of the invention.

What is claimed is:

1. A multichannel signal transmitting and receiving apparatus comprising:
    a single reference local oscillator producing a signal of an output oscillation frequency;
    a first frequency divider for dividing said output oscillation frequency with a specific frequency division ratio and producing an output;
    a phase locked loop circuit having a phase comparator receiving at one input thereof said output of the first frequency divider and producing an output, and a voltage controlled oscillator producing an output of an oscillation frequency controlled by said output of the phase comparator;
    a second frequency divider for frequency dividing the output of the voltage controlled oscillator with a frequency division ratio in accordance with each of a plurality of channels to produce a corresponding output and supplying said corresponding output as another input to the phase comparator;
    means for subjecting a signal received through an antenna to heterodyning by the oscillation output of the local oscillator and the oscillation output of the voltage controlled oscillator and thereafter detecting the resulting signal, thereby to obtain a first audio signal;
    means for obtaining a carrier wave for signal transmission from the oscillation outputs of the local oscillator and the voltage controlled oscillator;
    means for modulating said carrier wave for signal transmission with a second audio signal and transmitting the same through the antenna at times when said heterodyning means receives no antenna output signal;
    first changeover means for controllably changing over the oscillation frequency of the local oscillator between different values respectively for signal reception and transmission; and
    second changeover means for controllably changing over the frequency division ratio of the second frequency divider between different values respectively for signal transmission and reception for each of said channels.

2. A multichannel signal transmitting and receiving apparatus as claimed in claim 1, in which the means for obtaining the carrier wave for signal transmission is provided outside of the loop circuit of the phase locked loop and comprises a frequency converter for carrying out frequency conversion with the oscillation outputs of the local oscillator and the voltage controlled oscillator.

3. A multichannel signal transmitting and receiving apparatus as claimed in claim 1 which is adapted for use in signal transmission and reception of 27 MHz class D stations of the citizen band, and in which: the local oscillator oscillates at the time of signal reception with a frequency of 10.240 MHz, thereby to obtain a second intermediate-frequency signal; the frequency division ratio of the first frequency divider is 1,024; the voltage controlled oscillator generates a signal, of a frequency in accordance with a desired signal reception channel, which is necessary for frequency converting the reception signal of the desired chanel, and obtaining a first intermediate-frequency signal; and the frequency division ratio of the second frequency divider is so selected that said second frequency divider will produce as output a signal of a frequency of 10 KHz.

4. A multichannel signal transmitting and receiving apparatus as claimed in claim 3, in which the local oscillator is so controllably changed over by the first changeover means at the time of signal transmission as to oscillate with a specific frequency F differing by a frequency of the order of one to a few KHz from 10.240 MHz; the second frequency divider is so controllably changed over by the second changeover means as to accomplish frequency division with a frequency division ratio of a value differing from the value corresponding to each channel at the time of signal reception, thereby to cause the value resulting from the frequency division of the oscillation output of the voltage controlled oscillator to become equal to F/1,024; and the means for obtaining the carrier wave for signal transmission produces as output, from the outputs of the local oscillator and the voltage controlled oscillator, a carrier wave output approximating the carrier wave frequency of a specific channel with a deviation of a maximum of a number of tens of Hz relative to the carrier wave frequency of said specific channel.

5. A multichannel signal transmitting and receiving apparatus as claimed in claim 1, in which the local oscillator comprises a crystal oscillator, and the first changeover means comprises means for switching over a capacitance connected to the crystal oscillator between a value for signal reception and a value for signal transmission.

* * * * *